US006691159B1

(12) United States Patent
Grewal et al.

(10) Patent No.: US 6,691,159 B1
(45) Date of Patent: Feb. 10, 2004

(54) WEB-BASED METHOD AND SYSTEM FOR PROVIDING ASSISTANCE TO COMPUTER USERS

(75) Inventors: Sukhminder S. Grewal, New Haven, CT (US); Kevin Hofmann, Acworth, GA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/511,725

(22) Filed: Feb. 24, 2000

(51) Int. Cl.[7] .............................. G06F 15/16; G09G 5/00
(52) U.S. Cl. ...................... 709/219; 709/203; 345/705; 345/712; 345/714
(58) Field of Search ................................. 709/203, 217, 709/218, 219; 713/100; 379/900, 218.01; 707/522, 501.1; 345/705, 712, 714; 715/500.01, 501.1, 513

(56) References Cited

U.S. PATENT DOCUMENTS

| | | | |
|---|---|---|---|
| 4,992,972 A | | 2/1991 | Brooks et al. |
| 5,179,695 A | | 1/1993 | Derr et al. |
| 5,239,617 A | | 8/1993 | Gardner et al. |
| 5,361,361 A | | 11/1994 | Hickman et al. |
| 5,388,251 A | | 2/1995 | Makino et al. |
| 5,477,447 A | | 12/1995 | Luciw et al. |
| 5,644,735 A | | 7/1997 | Luciw et al. |
| 5,715,415 A | | 2/1998 | Dazey et al. |
| 5,754,176 A | | 5/1998 | Crawford |
| 5,823,781 A | * | 10/1998 | Hitchcock et al. .......... 434/118 |
| 5,877,757 A | | 3/1999 | Baldwin et al. |
| 5,933,140 A | | 8/1999 | Strahorn et al. |
| 6,098,061 A | | 8/2000 | Gotoh et al. |
| 6,177,932 B1 | * | 1/2001 | Galdes et al. ............... 345/733 |
| 6,208,338 B1 | | 3/2001 | Fischer et al. |
| 6,230,287 B1 | | 5/2001 | Pinard et al. |
| 6,236,989 B1 | | 5/2001 | Mandyam et al. |
| 6,297,822 B1 | | 10/2001 | Feldman |
| 6,300,950 B1 | | 10/2001 | Clark et al. |
| 6,471,521 B1 | * | 10/2002 | Dornbush et al. .......... 434/322 |
| 6,477,531 B1 | * | 11/2002 | Sullivan et al. ............. 707/10 |
| 6,493,000 B1 | * | 12/2002 | Wynn et al. ................ 345/733 |
| 6,535,492 B2 | * | 3/2003 | Shtivelman ................ 370/270 |

OTHER PUBLICATIONS

Pitsco's Ask an Expert web site (1999), as printed May 22, 2003, pp. 1–8.*
Online tech guides web site (1998), as printed on May 22, 2003, pp. 1–4.*
Defining and designing the performance–centered interface: moving beyond the user–centered interface, McGraw, K., Interactions, vol. 4, Issue 2, Mar./Apr. 1997, ACM ISSN: 1072–5520.*

* cited by examiner

Primary Examiner—Mark R. Powell
Assistant Examiner—Beartiz Prieto
(74) Attorney, Agent, or Firm—Armstrong Teasdale LLP

(57) ABSTRACT

The system provides an integrated approach to providing users of the computer system with education, information and computer assisted help on a specific subject, problem or a project. The system further offers flexibility in providing direct human interaction by linking a group of experts through a web site. For a specific subject, the system provides two distinct paths to the user, an Education Path and an Expert Assistance Path. The system further provides the user an opportunity to contact an expert through direct e-mail link, or to chat on-line with an expert and to obtain phone call assistance at the user's request.

27 Claims, 8 Drawing Sheets

WEB-BASED METHOD AND SYSTEM FOR PROVIDING ASSISTANCE TO COMPUTER USERS

BACKGROUND OF THE INVENTION

This invention relates generally to a computer network-based system and more particularly to a system and method for providing assistance to computer users in an organization on a variety of issues.

For business entities having numerous employees located in multiple divisions worldwide, getting help on a timely basis for computers or systems related issues is a major challenge. Locating a person within an organization to resolve an issue is sometimes difficult in such business entities. Another challenge involves getting an opportunity to discuss the problem with a qualified individual. During the process of locating the appropriate individual and finding a mutually convenient time to discuss the issue, there is normally a significant delay due to exchange of messages and time lag between phone calls from experts.

For example, when a computer user desires to contact a help desk to resolve an issue, the user typically uses one of the traditional methods such as telephone, filling out the forms identifying a problem, undertaking research via the Internet on World Wide Web, or voice mails to identify the problem. These methods are generally cumbersome, impersonal and time consuming. Voice mail systems are not only complex to follow but may also be unresponsive to a computer user's needs. Overall, the traditional methods can be very frustrating and may not necessarily facilitate resolving computer user's issues.

It would be desirable to facilitate resolving technical and non-technical issues or any other general inquiries pertaining to a variety of subjects for a user of a computer system in an efficient manner.

BRIEF SUMMARY OF THE INVENTION

The invention provides an integrated approach to providing users of the computer system with education, information and computer assisted help on a specific subject, problem or a project. The system further offers flexibility in providing direct human interaction by linking group of experts through a web site. For a specific subject, the invention provides two distinct paths to the user—an Education Path and an Expert Assistance Path. Both of these distinct paths offer various alternatives to resolve the user's issues. Under Education Path, the user can obtain information from global sources, receive organized product information or obtain information on training, schedule and cost. Under Expert Assistance Path, the user can interact with an expert or a group of experts. The invention further provides the user an opportunity to contact an expert through direct e-mail link, or to chat on-line with an expert. The system is capable of brokering phone call assistance to the user at user's request. The system takes into account available resources and key utilization metrics pre-established for the system's efficient performance.

DETAILED DESCRIPTION OF THE INVENTION

A support portal (Supportal) that assists users on a variety of issues is described. The Supportal, in an exemplary embodiment, is a single entry point through which individuals can seek support, training and action. The Supportal further provides an integrated approach to providing internal users or customers with education, information and computer assisted or human help on a specific subject, problem or a project.

Figure 1:
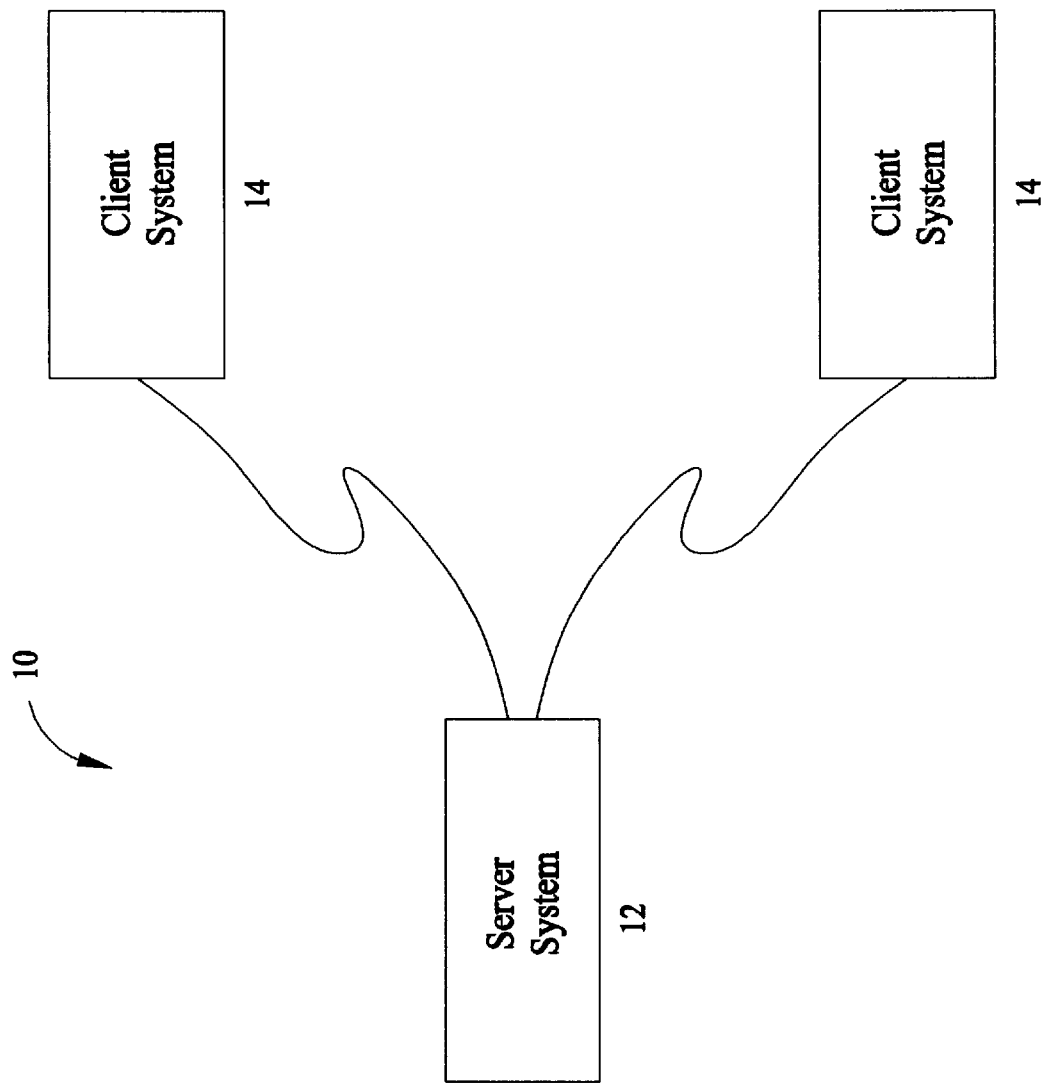
FIG. 1 is a system block diagram.

FIG. 1 is a block diagram of a system 10 in accordance with one embodiment of the present invention. System 10 includes a server system 12 and a plurality of client systems 14 connected to server system 12. In one embodiment, a client system 14 is a computer including a web browser. Server system 12 is accessible to client system 14 via the Internet. Client system 14 is interconnected to the Internet through many interfaces including dial-in-connections, cable modems, special high-speed ISDN lines and networks such as local area networks (LANs) or wide area networks (WANs). Client system 14 could be any client system capable of interconnecting to the Internet including a web-based phone or other web-based connectable equipment. Servers storing information are integrated with server system 12 and can be accessed by potential users at one of client systems 14 by logging onto server system 12.

Figure 2:
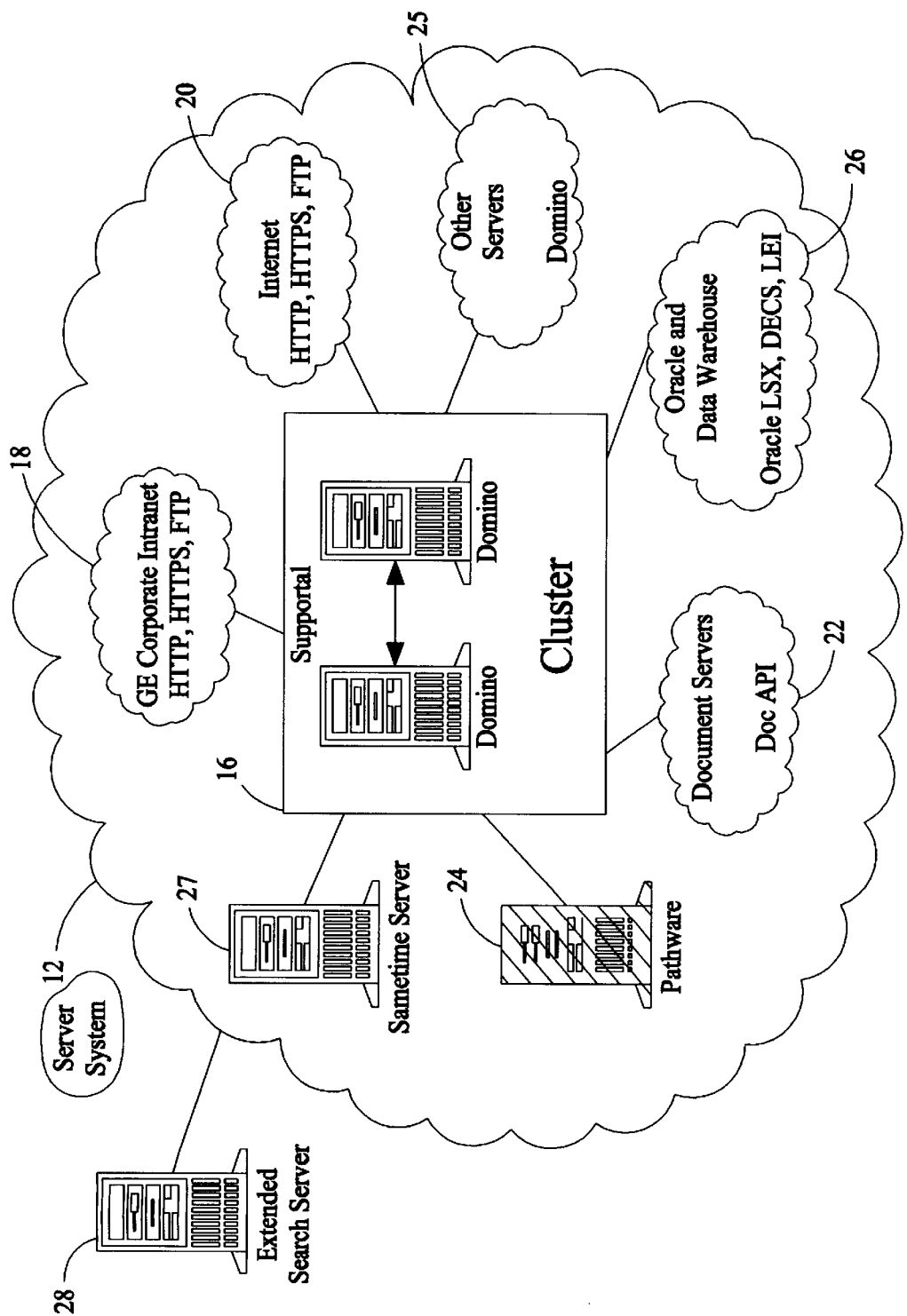
FIG. 2 is an overview of a server system.

FIG. 2 is an overview of server system 12. A core 16 of the Supportal within server system 12 comprises a domino cluster. These clustered servers are configured using an Internet Cluster Manager, which are well known. The Internet Cluster Manager (ICM) allows web servers and databases to become easily available to clients by avoiding failover and workload balancing. The Supportal facilitates the discovery of information. Information can exist in many formats and in many locations. Using a variety of connection methods, the Supportal connects the user with the information. The Supportal can, for example, direct users to a corporate Intranet 18, the Internet 20, Document Server 22, Pathware Server 24 and other types of servers 25. In addition, the server uses databases 26 such as Oracle LSX, LEI and DECS to exchange information with other databases. In addition, the Supportal also provides Instant Messaging, Chat Room and Webinars services by utilizing Sametime server 27. Server 12 also includes an extended search server 28 for extended search to index content linked to the Supportal and to allow the user to search for information.

Figure 3:
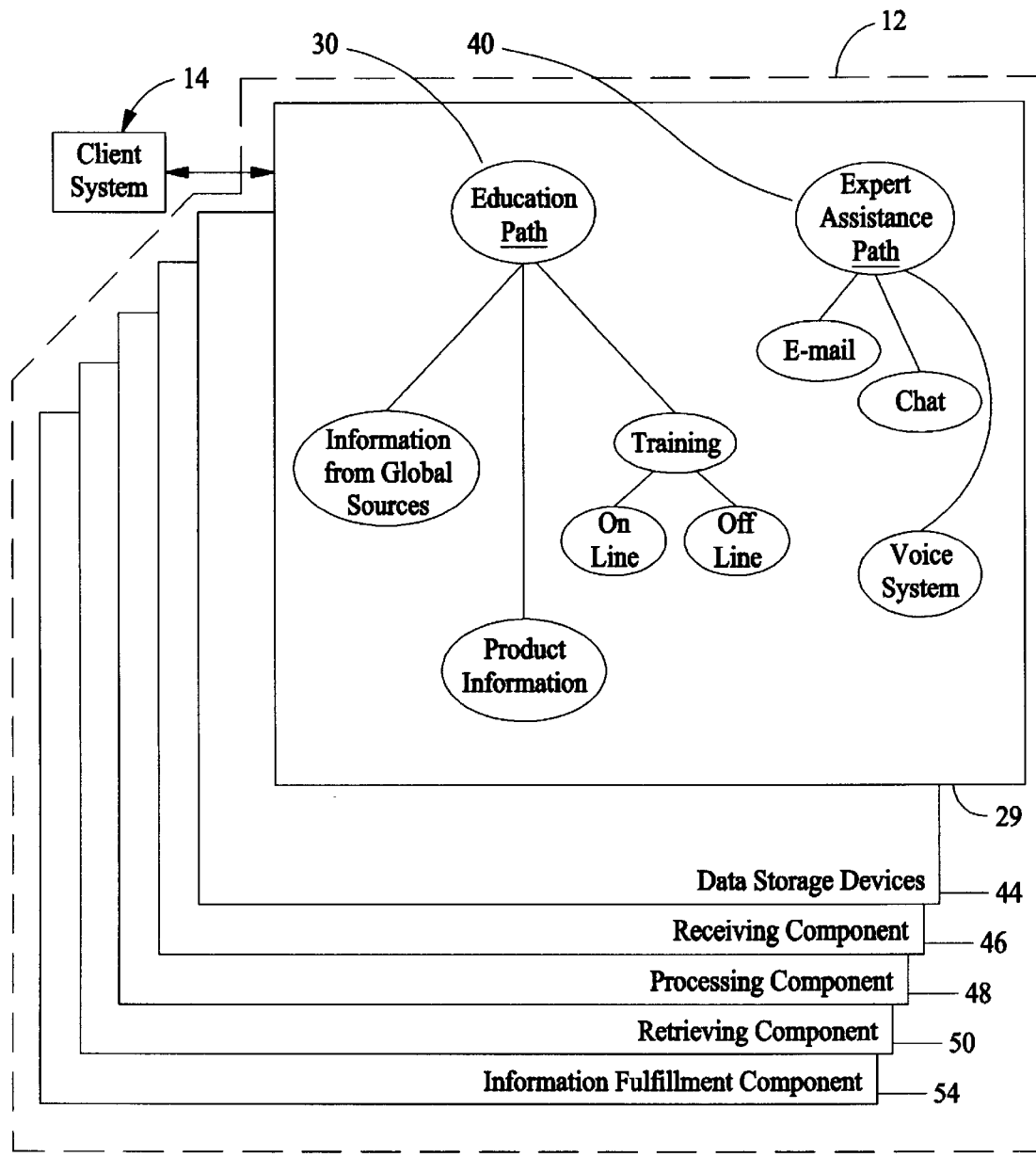
FIG. 3 shows a configuration of a database.

FIG. 3 shows a configuration of a database 29 within server system 12. Database 29 includes two separate components which perform specific tasks. One database component is referred to as an Education Path Component 30 and the other database component is referred to as an Expert Assistance Path Component 40. These two components are further organized into data storage devices 44, a receiving component 46 for receiving request from client system 14, a processing component 48 for searching and processing received request against the data storage device 44 containing a variety of help related information, a retrieving component 50 to retrieve information from the data storage device, and an information fulfillment component 54 that downloads the requested information after retrieving from the data storage device to a plurality of users in the order in which the requests were received by the receiving component.

In the example embodiment, retrieving component 50 is further configured with a display component that is configured to download information to be displayed on a user interface of client system 14, and a printing component that is configured to print information. Information that is printed may be printed in a pre-determined format.

Web-based system 10 is accessed through a home page which provides the user with the ability to navigate and search information. The system allows a user to navigate, search, and in some cases create/edit/delete online documentation, manuals (also available in downloadable format), frequently asked questions, articles & URL's, various pages and other discussion materials. When a first time user enters the site, the user is presented with a generic page (not shown). After the user "sign up" for the system, a cookie is set up on the user's computer, which allows the system to customize the page on next return. Each home page also consists of several pre-set frames (not shown).

Figure 4:
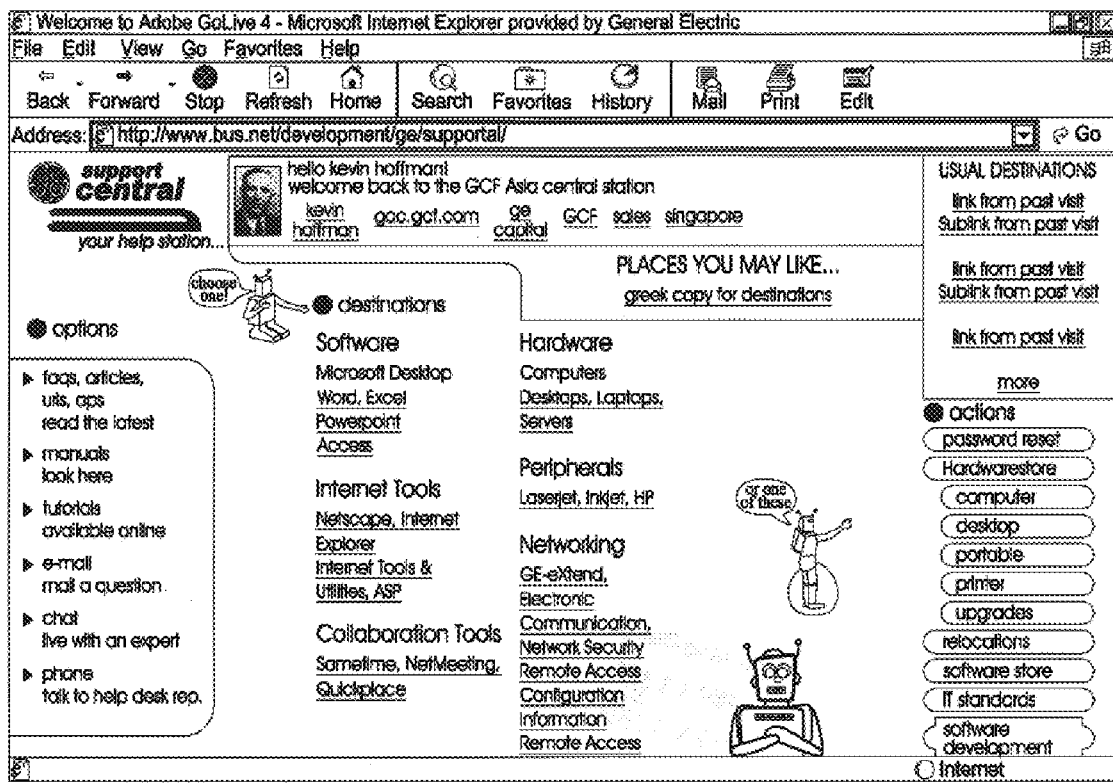
FIG. 4, a first user interface, is a web page downloaded on a client system by the server system after the user has logged on to the site.

FIG. 4, a first user interface 70, is a web page downloaded on client system 14 by server system 12 after the user has logged on to the site. First user interface 70 provides various alternative hypertext links to the user.

Figure 5:
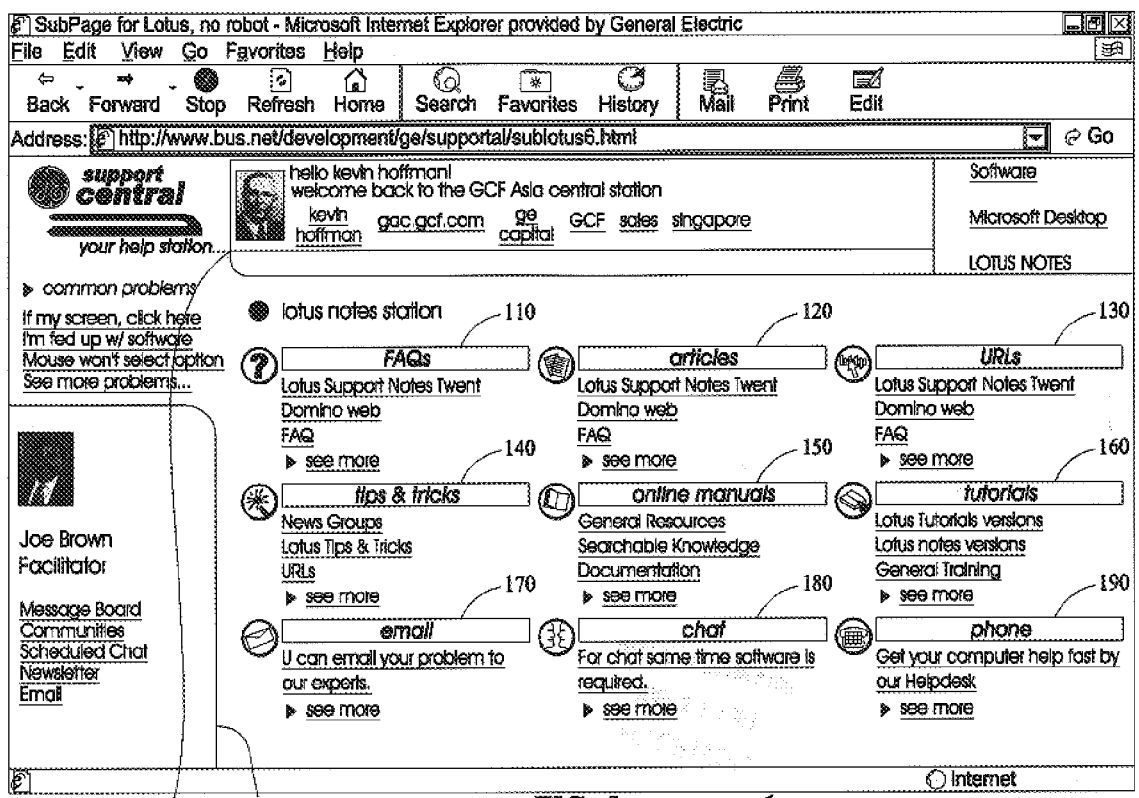
FIG. 5 is an exemplary embodiment of a second user interface.

FIG. 5 is an exemplary embodiment of second user interface 100 that displays the various hypertext link alternatives to the user. These alternatives include: a frequently asked questions (FAQ) hypertext link 10, various related articles hypertext link 120, an URL hypertext link 130, tips and tricks hypertext link 140, an online manuals hypertext link 150, tutorials hypertext link 160, an e-mail hypertext link 170, a chat hypertext link 180, a phone hypertext link 190, a photograph 192 of an internal user, and a photograph 194 of a facilitator which includes hypertext links. The above described user interface and other user interfaces including various hypertext links described herein can be re-arranged in many different ways and can be used in various environments other than the Internet.

Frequently asked questions 110 include a list of frequently asked questions with their corresponding answers. Various related articles 120, tips and tricks 140 and Online Manuals 150 hypertext links allow the system to link online documentation and online manuals. The system is further capable of more formalized process of document management and publication.

E-mail 170, chat 180 and phone 190 are designated as contact areas where users, experts and system owners communicate with each other on subjects relating to overall system, its effectiveness or any other pertinent issues. Server system 12 is capable of managing multiple inquiries from a variety of users through e-mail 170, chat 180 or phone system 190. E-mail 170 has a number of features. One of the features allows users to formulate questions on a form and to post the question to a panel of experts. The user may assign questions to any number of experts within a panel of experts. System 10 also permits listing of average response time to answer a question. The user can select any particular expert based on the waiting time.

Chat feature 180 allows users to instantly communicate with a panel of experts within an organization. The user is offered three methods: 1) instant message with one customer expert, 2) on-line meeting with a panel of customer experts, and 3) Community Chat Room. The user selects one of these options based on a number of factors including the expert's availability.

Phone feature 190 represents the synchronous method of communication between customers and experts. This feature allows the customer to view a list of experts and their contact information. It also provides a mechanism that the customer can record a call log.

System 10 (described in FIG. 1) offers flexibility to identify an expert based on a keyword match. System 10 is capable of being selecting an expert based on a keyword match after comparing and analyzing a user's request against the expertise and biographical data of the available experts.

Figure 6:
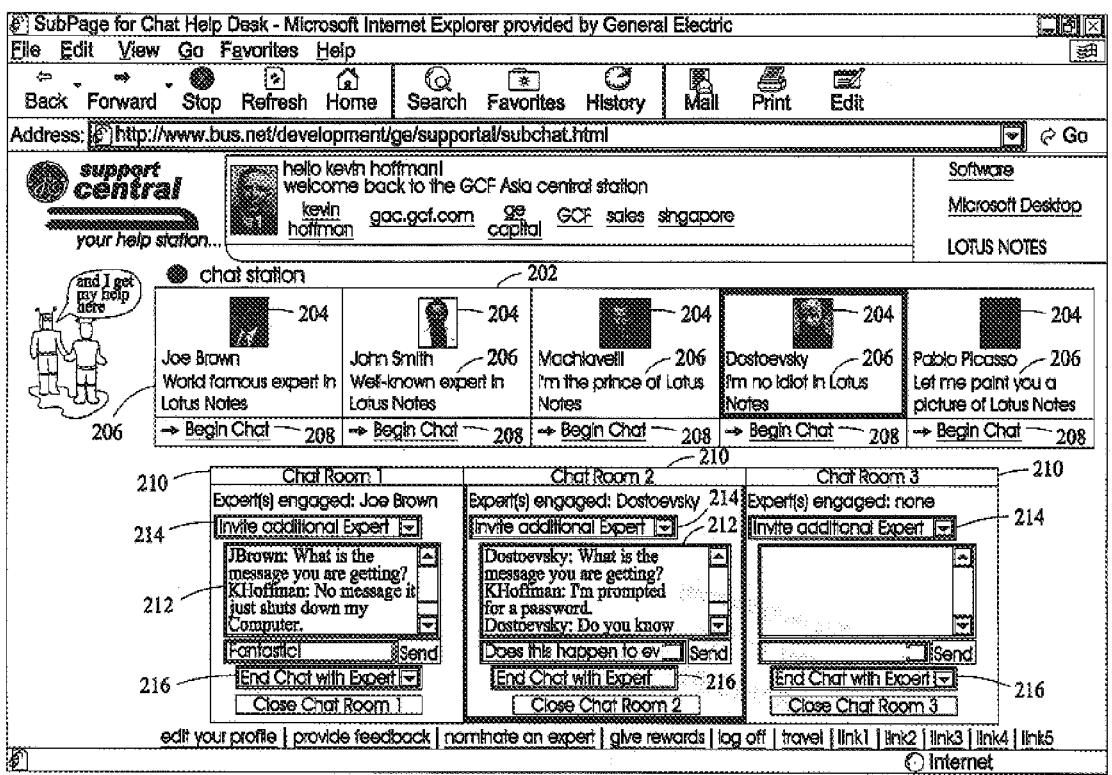
FIG. 6 is an exemplary embodiment of a chat room user interface.

FIG. 6 is an exemplary chat room user interface 200. Selection of chat feature 180 (shown in FIG. 5) causes a pool of experts 202 to be selected for an online meeting. Included in expert pool 202 are photographs 204 of the experts, areas of expertise and biographical data 206, such as length of service and testimonials, on each expert, and a link 208 to be used to engage the expert. A chat room window 210 shows which, if any, expert is engaged with the user and includes a textual dialog box 212 which shows the textual interchange between the expert and the user. Multiple chat room windows 210 can be used to engage a different expert and additionally, other experts can be invited into an active chat within one window by selecting an invite additional expert link 214 located within window 210. A user may also choose to end a chat with a particular expert by selecting that expert in a end chat menu 216.

Figure 7:
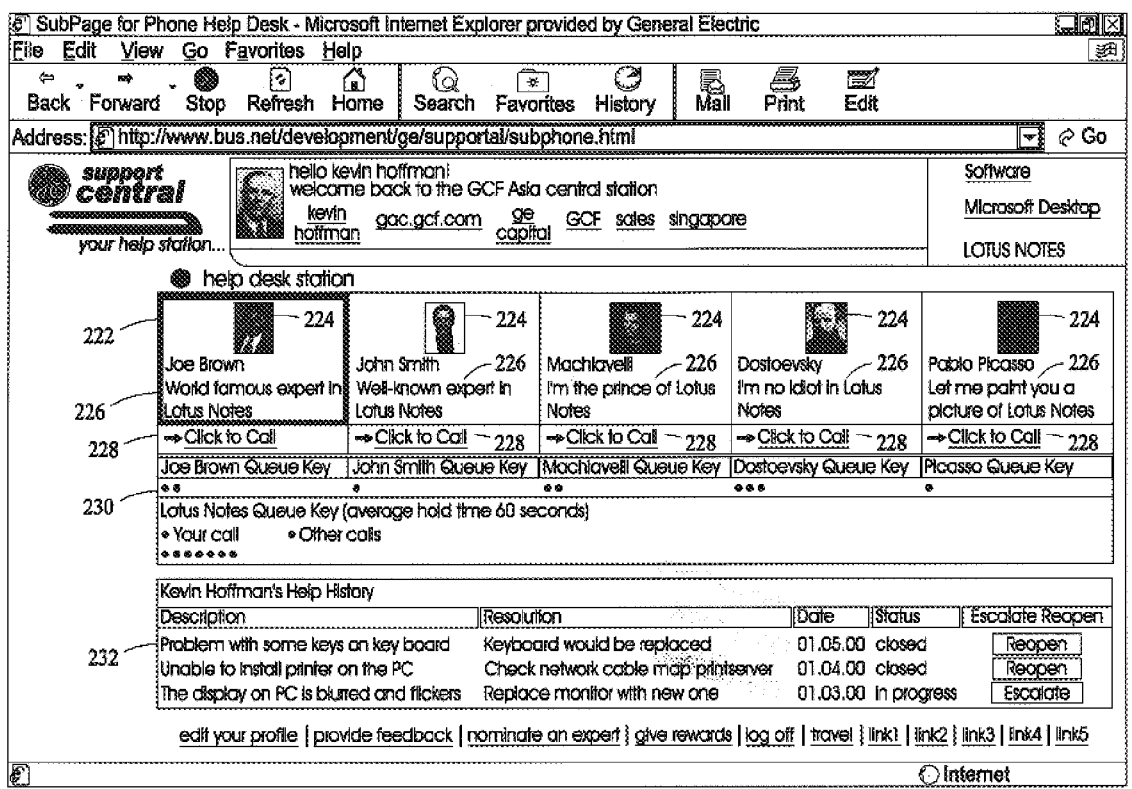
FIG. 7 is an exemplary embodiment of a telephone request user interface.

FIG. 7 is an exemplary phone request user interface 220. Selection of phone feature 190 (shown in FIG. 5) causes a pool of experts 222 to be selected for a telephone contact. Included in the expert pool 222 are photographs 224 of the experts, areas of expertise and biographical data 226, such as length of service and testimonials, on each expert, and a link 228 to be used to call that expert. Also included in expert pool 222 is a queue indicator 230 which shows how many calls are in the queue of each expert and also shows where the user's call is in relation to other calls in the queue. User interface 220 includes a history 232 which shows previous user interactions with the available experts.

Figure 8:
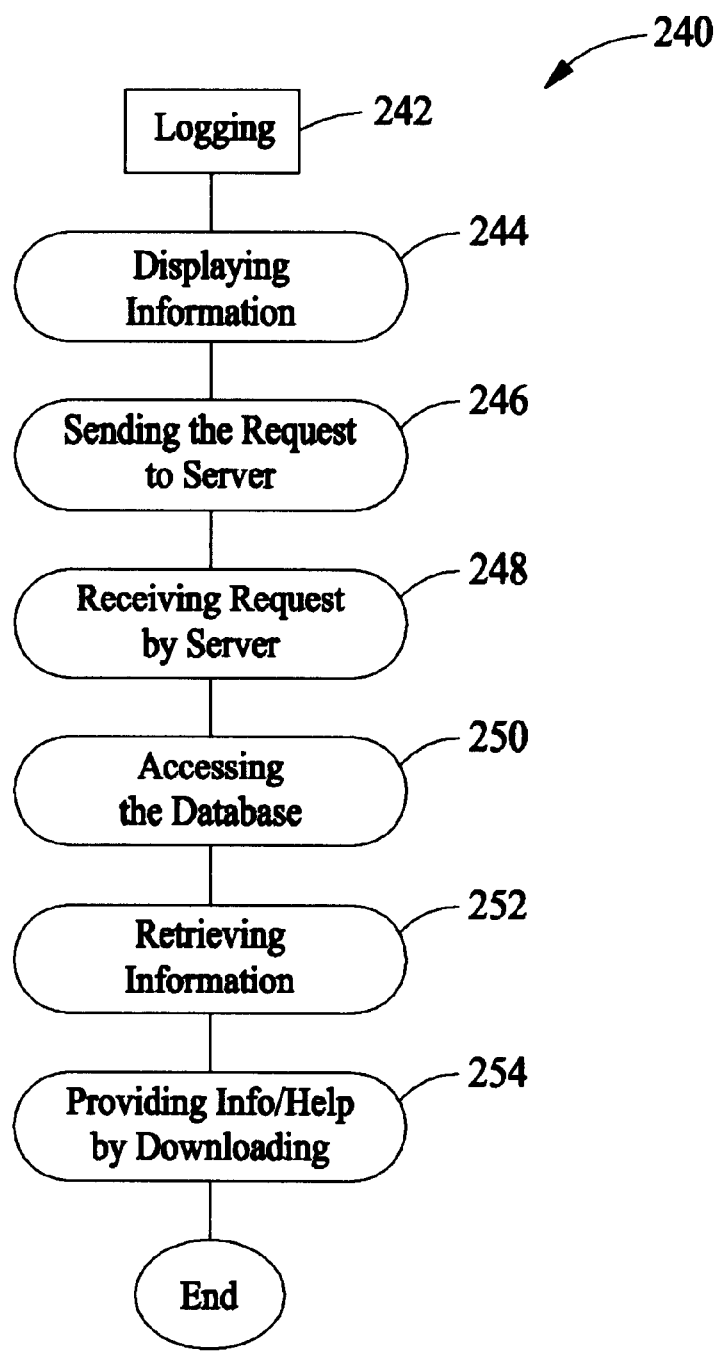
FIG. 8 describes an algorithm as used by the system to help a user when the user logs on to a home page of the web site through the client system.

FIG. 8 describes an algorithm 240 as used by the system to help a user when the user logs on to a home page of the web site through client system 14. After logging 242, the user requests help through client system 14 by selecting one of a hypertext link displayed out of all displayed 244 hypertext links. Once the user makes a specific selection, the specific selection is sent to server system 12. The sending 246 is accomplished in response to click of a mouse or to a voice command. Once server system 12 receives 248 the request, server system 12 displays the information in response to this request on client system 14. Server system 12 accesses 250 the database and retrieves 252 related information from the database. The requested information is provided 254 to client system 14 by downloading the information from server 12. In one embodiment, client system 14 as well as server system 12 are protected from access by unauthorized individuals.

While the invention has been described in terms of various specific embodiments, those skilled in the art will recognize that the invention can be practiced with modification within the spirit and scope of the claims.

What is claimed is:

1. A method for providing help to a user using a web-based system including a server system coupled to a centralized database and at least one client system, said method comprising:
   displaying information on the client system identifying alternative paths for assistance to the user, the alternative paths include at least one of an educational path and an expert assistance path, the educational path includes information from a plurality of sources relating to a plurality of subject matters, the expert assistance path includes a pool of available experts on a plurality of subject matters stored within the database wherein an available expert is an expert currently in communication with the client system;
   receiving a request from the client system relating to a user selected alternative;
   accessing the centralized database;
   retrieving information from the database related to the user selected alternative;
   displaying on the client system after the user has selected the expert assistance path at least one available expert with corresponding expert information that satisfies the user request;
   displaying on the client system a waiting time for each available expert displayed;
   enabling a user to select at least one available expert from the display; and
   prompting a user to submit an inquiry to the selected available expert for a response, the inquiry submitted through the client system via at least one of instant messaging, on-line meeting, and on-line chat.

2. A method according to claim 1 wherein said step of displaying information further includes the step of displaying information relating to a frequently asked questions (FAQ) alternative supplied by the server system.

3. A method according to claim 1 wherein said step of displaying information further includes the step of displaying information relating to an online manuals alternative supplied by the server system.

4. A method according to claim 1 wherein said step of displaying information further includes the step of displaying information relating to various useful articles and URL alternatives supplied by the server system.

5. A method according to claim 1 wherein said step of displaying information further includes the step of displaying information relating to a tutorials alternative supplied by the server system.

6. A method according to claim 1 wherein said step of displaying information further includes the step of displaying information relating to an alternative to email problem to experts at help desk supplied by the server system.

7. A method according to claim 1 wherein said step of displaying information further includes the step of displaying information relating to an alternative to chat with expert on-line supplied by the server system.

8. A method according to claim 1 wherein said step of displaying information further includes the step of displaying information relating to an alternative to call expert at help desk supplied by the server system.

9. The method according to claim 1 wherein the client system and the server system are connected via a network.

10. The method according to claim 9 wherein the network is one of a wide area network, a local area network and the Internet.

11. The method according to claim 1 wherein said step of displaying further includes displaying an HTML document provided by the server system.

12. A method according to claim 1 wherein said step of displaying further comprises the step of displaying at least one alternative of service out of various alternatives available to the user.

13. A method according to claim 1 wherein said step of sending a request to receive information relating to specific alternative further comprises the step of inputting the user contact information data including a description of a problem.

14. A web-based system for providing help to a user, said system comprising:
   a client system comprising a browser;
   a data storage device for storing information pertaining to at least one of an educational path component and an expert assistance path component, the educational path component includes information from a plurality of sources relating to a plurality of subject matters and the expert assistance path component includes a pool of available experts on a plurality of subject matters wherein an available expert is an expert currently in communication with the client system; and
   a server system configured to be coupled to said client system, said server system further configured to:
      receive a request from the client system relating to at least one of an educational path component and an expert assistance path component;
      access the centralized database;
      retrieve information from the database relating to the at least one of an educational path component and an expert assistance path component;
      display on the client system after the user has selected the expert assistance path at least one available expert with corresponding expert information that satisfies the user request;
      display on the client system a waiting time for each available expert displayed;
      enable a user to select at least one available expert from the display; and
      prompt a user to submit an inquiry to the selected available expert for a response, the inquiry submitted through the client system via at least one of instant messaging, on-line meeting, and on-line chat.

15. A system according to claim 14 wherein said client system is further configured with:
   a display component for displaying information identifying various alternatives to the user; and
   a selection ordering component that in response to selecting sends a request to a server system so that the server system can download the requested information to the client system.

16. A system according to claim 15 wherein the selection ordering component functions in response to clicking of a mouse button.

17. A system according to claim 15 wherein the selection ordering component functions in response to a voice command.

18. The client system of claim 15 is protected from access by unauthorized individuals.

19. A system according to claim 14 wherein said server system is further configured with a receiving component for receiving requests to provide help from one of the plurality of users.

20. A system according to claim 14 wherein said server system is further configured with a processing component for searching and processing received requests against the data storage device containing variety of help related information.

21. A system according to claim 14 wherein said server system is further configured with a retrieving component to retrieve information from the data storage device.

22. The server system according to claim 21 wherein the retrieving component further configured to retrieve and send additional information to the client system based on a request received from the client system including at least one of:

frequently asked questions (FAQ) alternative;

online manuals alternative;

various related articles and URL alternative;

tutorials alternative;

an alternative to email problem to experts at help desk;

an alternative to chat with expert on-line; and an alternative to call expert at help desk.

23. The server system according to claim 21 wherein the retrieving component is further configured with:

a display component configured to download information to be displayed on client system's graphical user interface; and a printing component configured to print information.

24. The server system according to claim 23 wherein the information to be printed is in a pre-determined format.

25. A system according to claim 14 wherein said server system is further configured with an information fulfillment component that downloads the requested information after retrieving from the data storage device to the plurality of users in the order in which the requests were received by the receiving component.

26. The server system according to claim 14 wherein the request to provide help is sent by a client system to the server system.

27. The server system according to claim 14 wherein said server system is further configured to protect said data storage device from access by unauthorized individuals.

* * * * *